(12) United States Patent
Kono

(10) Patent No.: US 6,874,787 B2
(45) Date of Patent: Apr. 5, 2005

(54) BRUSH SEAL DEVICE

(75) Inventor: Toru Kono, Sakado (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 17 days.

(21) Appl. No.: 10/052,353

(22) Filed: Jan. 23, 2002

(65) Prior Publication Data

US 2002/0140174 A1 Oct. 3, 2002

(30) Foreign Application Priority Data

Mar. 30, 2001 (JP) .................................... 2001-100322

(51) Int. Cl.[7] .............................................. F16J 15/44
(52) U.S. Cl. ...................................................... 277/355
(58) Field of Search ................................ 277/355, 492, 277/496–499

(56) References Cited

U.S. PATENT DOCUMENTS

| | | | | |
|---|---|---|---|---|
| 1,360,820 A | * | 11/1920 | Thompson | .................. 277/474 |
| 4,537,406 A | * | 8/1985 | Hirasuna et al. | ............. 277/314 |
| 5,226,683 A | * | 7/1993 | Julien et al. | ................. 285/363 |
| 5,749,584 A | * | 5/1998 | Skinner et al. | .......... 415/173.5 |
| 6,030,175 A | * | 2/2000 | Bagepalli et al. | ......... 415/173.3 |
| 6,168,162 B1 | * | 1/2001 | Reluzco et al. | ............. 277/355 |
| 6,431,550 B1 | * | 8/2002 | Tong | .......................... 277/346 |

* cited by examiner

*Primary Examiner*—Chuck Mah
*Assistant Examiner*—Michael J. Kyle
(74) *Attorney, Agent, or Firm*—Arent Fox, PLLC

(57) ABSTRACT

The present invention relates to a brush seal device for shutting off a gap between splitting surfaces so as to prevent sealed fluid from leaking out from the gap. Each of the splitting surfaces is composed of splitting direction-extending surfaces that extend in such a direction as to split split-body parts and a longitudinal surface that extends in the longitudinal direction of the split-body parts and that forms a step-like surface interposed between the splitting direction-extending surfaces. Shutoff means for sealing the gap between the splitting direction-extending surfaces so as to prevent leakage of sealed fluid is provided in the gap between the splitting direction-extending surfaces that are combined with each other.

10 Claims, 12 Drawing Sheets

BRUSH SEAL DEVICE

FIELD OF THE INVENTION

The present invention relates to a brush seal device for performing sealing by means of a brush seal that separates high-pressure and low-pressure sides between component members that are opposed to each other. In particular, the present invention relates to an assembly-type brush seal device that allows enlargement through combination of split-body parts and that can be assembled with or removed from a shaft easily.

BACKGROUND OF THE INVENTION

A brush seal device 100 shown in FIG. 15 is based on an art related to the present invention.

FIG. 15 is a cross-sectional view of a brush seal device 100 mounted in a fitting portion between a casing 120 and a rotational shaft 130, for example, of a steam turbine. FIG. 16 is a plan view of the inner periphery of a connecting portion of the brush seal device shown in FIG. 15.

In FIGS. 15 and 16, when the brush seal device 100 is installed between bearings of the steam turbine, brush seal split parts 101, into which the brush seal device 100 is divided, are connected to one another and assembled into an annular body surrounding the rotational shaft 130, without removing the rotational shaft 130 or the bearings. Each of the brush seal split parts 101 has connecting portions at its opposed ends and is connected at the connecting portions to adjacent ones of the brush seal split parts 101.

Even in the case where the rotational shaft 130 has a large diameter, since the brush seal device 100 is designed as a split type, sequential assembly of the brush seal split parts 101 makes it unnecessary for a large number of operators to perform the assembling operation while hoisting a bulky annular brush seal device by means of a crane or the like.

The brush seal device 100 is mounted in a mounting groove 121 formed in the casing 120. The brush seal device 100 is pressed inwards in a springy manner from the outer periphery side by a leaf spring (not shown). Therefore, a space portion 122 exists between the outer peripheral surface of the brush seal device 100 and the surface in which the mounting groove 121 is formed.

A multitude of bristles 103 are disposed in a wall shape along the inner periphery of the brush seal device 100 as shown in FIG. 17, which illustrates another related art. The outer periphery of a brush seal 102 composed of the bristles 103 is mounted to a mounting portion 104. The brush seal 102 is disposed slantingly and is designed to be opposed to a rotational shaft (not shown).

The mounting portion 104 of the brush seal 102 is fixed to a back plate 105. The brush seal 102 is designed, in a region ranging from the mounting portion 104 to its free end, to be supported by the back plate 105 and not to be deformed substantially even if sealed fluid acts thereon from the side of a pressure P1. A holding plate 107 fixes the mounting portion 104 of the brush seal 102 together with the back plate 105 by welding. As shown in FIG. 16, the brush seal split parts thus constructed are arranged in the circumferential direction at intervals of one-sixth of the circumference.

Each of these brush seal split parts is in the shape of an arc and has splitting surfaces 110 at its opposed ends. Each of the splitting surfaces 110 of each of the brush seal split parts is connected to the splitting surface 110 of another corresponding one of the brush seal split parts, so that an integral-type annular body is formed. Each of the splitting surfaces 110 is composed of axial surfaces 111 and a radial surface 112 and thus assumes a step-like structure.

When these brush seal split parts are in a mounted state, the splitting surfaces 110 are joined to one another. However, as shown in FIG. 16, the axial surface 111 of the brush seal device 100 allows a narrow gap C1 to be created due to an operational force resulting from oscillation of the rotational shaft 130 or the like. In such a case, sealed fluid on the side of the high pressure P1 flows through the gap C1 on the side of the high pressure P1, reaches the space portion 122, flows through a gap C2 on the side of a low pressure P2, and leaks out to the side of the low pressure P2.

FIG. 17 shows the brush seal device according to another related art. FIG. 17 is a side view of a connecting portion 109 of the brush seal device 100. FIG. 18 is a plan view of the brush seal device 100 shown in FIG. 17 as viewed from its inner-diameter side in the direction of an inclining gap C3.

The brush seal device 100 shown in FIG. 17 has the splitting surfaces 110 that are formed in the connecting portion 109 in such a manner as to incline with respect to the radial direction. Even in the case of the splitting surfaces 110, if adjacent ones of the brush seal split parts are displaced in opposite directions, the gap C3 is widened. Then, sealed fluid leaks out from the gap C3.

In the related arts described above, the gap C between the splitting surfaces 110 is widened if the operational force of the rotational shaft 130 or the pressure P1 of sealed fluid is directly applied to the brush seal device 100. Thus, sealed fluid leaks out to the side of the low pressure P2 through the gap C. In particular, if the brush seal device 100 wobbles during rotation as a result of oscillating or swaying movements of the rotational shaft 130, the rotational shaft 130 comes into tight contact with the brush seal device 100. When the rotational shaft 130 is in contact with the brush seal device 100, the former applies an operational force to the latter. This operational force widens the gap between the splitting surfaces 110, 110. As a result, the sealing performance deteriorates to such an extent that sealed fluid leaks out from the gap between the splitting surfaces 110, 110. Therefore, deterioration of the ability to seal the gap between the splitting surfaces 110 looms as a serious problem.

Although the split-type brush seal device 100 is most preferably designed to be held in a springy manner from the outer peripheral side by a leaf spring or the like so as to counterbalance the effect of oscillation of the rotational shaft 130 or the like, the problem of leakage of sealed fluid from the gap C between the splitting surfaces 110, 110 makes it difficult to adopt such a construction in an effective way. Consequently, a large operational force that may be applied to the brush seal 102 from the rotational shaft 130 causes a problem of abrasion of the brush seal 102 at an early stage of its use.

The present invention has been made as countermeasures against the problems as described above. One technical aim of the present invention as a solution to the problems is to prevent leakage of sealed fluid through a gap between splitting surfaces of adjacent ones of brush seal split parts even if the gap has been widened.

Another technical aim of the present invention is to allow adoption of an excellent mechanism for preventing abrasion of bristles not only by the elastic force of the brush seal but also through elastic enlargement or reduction of the diameter of the brush seal split parts constituting an annular body.

SUMMARY OF THE INVENTION

The present invention has been made as a solution to the aforementioned problems. Means for achieving the technical aims are constructed as follows.

In a brush seal device according to a first preferred embodiment of the present invention, splitting surfaces of a plurality of split-body parts are combined with one another. The brush seal device is mounted to one of opposed component members so as to seal a gap between the component members. This brush seal device comprises a brush seal and the split-body parts. The brush seal is formed in a wall shape in the longitudinal direction of a fixture portion which is fixed at one end thereof. The split-body parts hold the brush seal. Each of the split-body parts has connecting portions that are split and that extend along splitting surfaces. Each of the splitting surfaces is composed of splitting direction-extending surfaces that extend in such a direction as to split the split-body parts and a longitudinal surface that extends in the longitudinal direction of the split-body parts and that forms a step interposed between the splitting direction-extending surfaces. Each of the splitting direction-extending surfaces has shutoff means for sealing a gap between the splitting direction-extending surfaces that are combined with each other.

In the brush seal device according to the first preferred embodiment of the present invention, the shutoff means for sealing sealed fluid is disposed between the splitting direction-extending surfaces. Therefore, even if the other of the component members, for example, the rotational shaft wobbles during rotation and comes into tight contact with the brush seal, leakage of sealed fluid from the gap between the splitting surfaces is prevented effectively.

In addition, the brush seal device of the present invention prevents leakage of sealed fluid from the gap between the splitting surfaces by means of the shutoff means even if a gap has been created between the splitting surfaces. Therefore, even if a pressing force resulting from, for example, oscillation of the rotational shaft or the like is applied to the brush seal device that is held in a springy manner from the outer peripheral side by a spring or the like, the brush seal device makes it possible to deform the brush seal and effectively increase or reduce the inner diameter of the brush seal in accordance with the pressing force.

BRIEF DESCRIPTRION OF THE DRAWINGS

DESCRIPTION OF THE PREFERRED EMBODIMENTS

Hereinafter, embodiments of the present invention will be described in detail with reference to the drawings.

Figure 1:
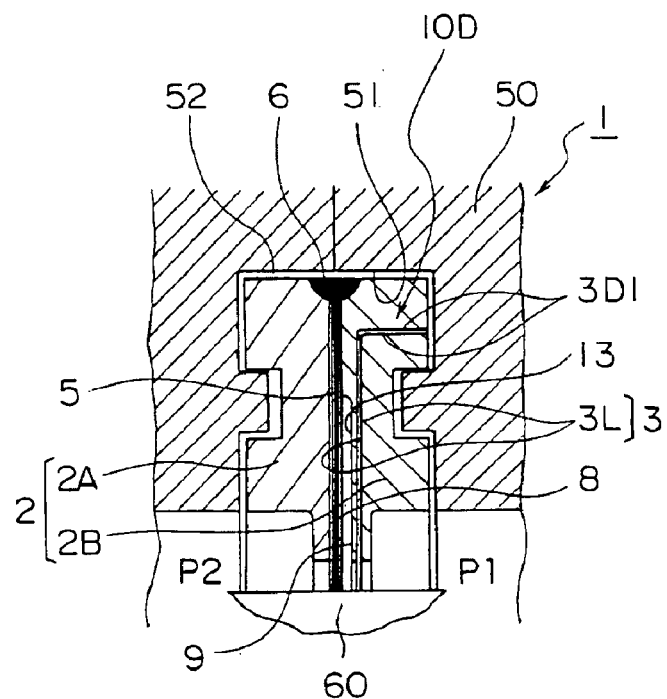
FIG. 1 is a cross-sectional view of a brush seal device according to a first preferred embodiment of the present invention, showing a state where the brush seal device is installed between two component members.

FIG. 1 is a cross-sectional view of a brush seal device 1 according to a first embodiment of the present invention. The brush seal device 1 is mounted in a mounting groove 51 of one of two component members, that is, a casing 50. The brush seal device 1 is disposed at a position opposite the other component member, that is, a rotational shaft 60.

Figure 3:
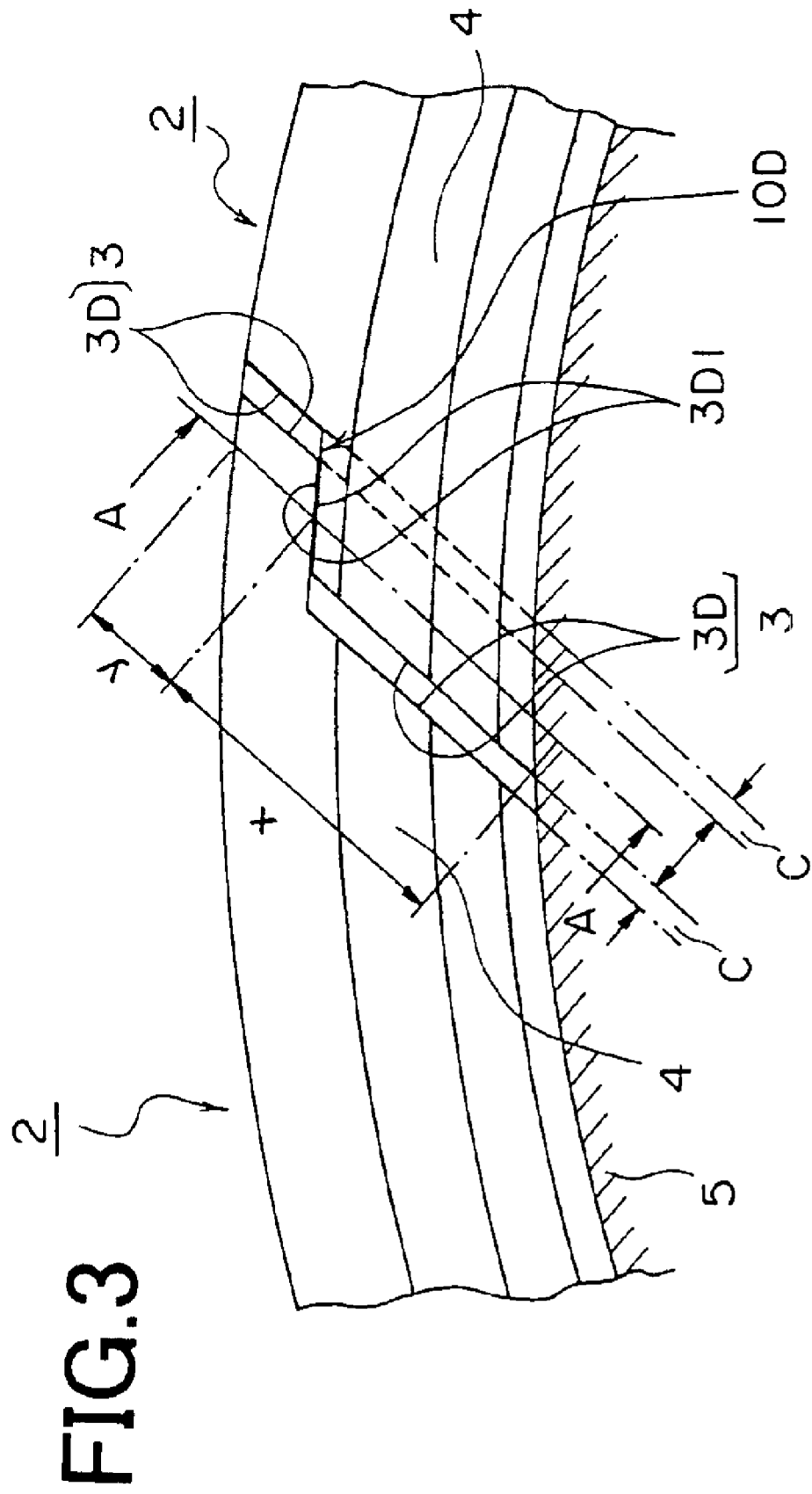
FIG. 3 is a side view of the brush seal device shown in FIG. 2.
Figure 4:
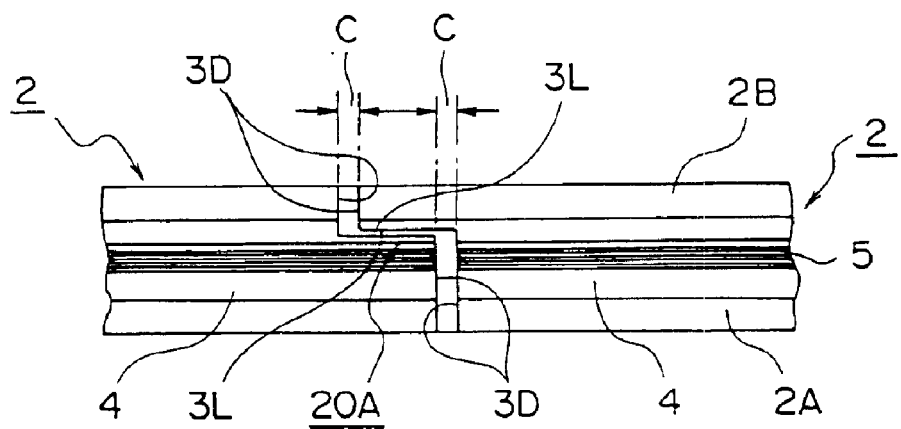
FIG. 4 is a plan view of the brush seal device shown in FIG. 2 as viewed from its inner-diameter side.

Splitting direction-extending surfaces 3D shown in FIG. 3 extend in the radial direction of the brush seal device 1 according to the side view shown in FIG. 1. A plan view of the brush seal device 1 as viewed from its inner-diameter side is generally as shown in FIG. 4.

In the brush seal device 1 shown in FIG. 1, a fixture portion 6 of a brush seal 5 is clamped between a back plate portion 2A and a holding plate portion 2B and integrated therewith by welding. This brush seal device 1 is composed of six split-body parts 2 that are arranged in the circumferential direction at equal intervals. The brush seal device 1 may be circumferentially divided into two, four, six, or any suitable number of split-body parts 2 that are equivalent in size.

The brush seal 5 has a multitude of bristles 7 that are arranged in the circumferential direction, stacked on one another, and formed in a wall shape. The bristles 7 constituting the brush seal 5 are fixed to the fixture portion 6 while inclining with respect to the radial direction by a certain angle.

The fixture portion 6 of the brush seal 5 is integrated with the back plate portion 2A. A supporting surface 8 of the back plate portion 2A supports the brush seal 5 so that the brush seal 5 can be sealed without being deformed drastically even if sealed fluid has acted thereon.

The holding plate portion 2B, which is integrated with the back plate portion 2A, is fixed to the back plate portion 2A in an integral manner while clamping the fixture portion 6 of the brush seal 5. This fixture method accomplishes integration on the basis of welding according to various welding methods. A recess portion 9 is formed in the holding plate portion 2B in such a manner as to define a space portion 13 between the brush seal 5 and a corresponding face of the holding plate portion 2B that is located opposite the brush seal 5, so that sealed fluid can act on the brush seal 5.

The back plate portion 2A and the holding plate portion 2B are fixed to each other by welding while the fixture portion 6 of the brush seal 5 is interposed therebetween. The split-body parts 2 are arranged in the circumferential direction at equal intervals.

The split-body parts 2, which include the back plate portion 2A and the holding plate portion 2B, are made from a nickel-based alloy. The materials contained in this alloy are selected from iron, steel, non-ferrous alloy, and the like, and differ depending on the conditions imposed by the field to which the present invention is applied. These conditions include the type of sealed fluid, the temperature, and the like. It is also required that these materials be selected in accordance with the linear expansion coefficient of the casing 50.

Furthermore, the bristles 7 constituting the brush seal 5 are made from copper wires, nickel-based alloy wires, ceramic wires, or the like. As an example, the bristles 7 have a diameter of 0.05 to 0.5 mm. The bristles 7 have a length of 5 to 50 mm. The stacked bristles 7 have a wall thickness of 0.5 to 4 mm.

If need be, these numerical ranges can be changed depending on the applied conditions.

As described above, the split-body parts 2 are arranged in the circumferential direction at equal intervals. In other words, if the split-body parts 2 are connected to one another with a splitting surface 3 of a connecting portion 4 of each of the split-body parts 2 connected to an adjacent splitting surface 3 of a connecting portion 4 of an adjacent one of the split-body parts 2, an annular body is formed.

As shown in FIGS. 3 and 4, each connecting portion 4 having a splitting surface 3 as its end surface is formed so that the split-body parts 2 can be connected to one another. Each splitting surface 3 is composed of two splitting direction-extending surfaces 3D and a longitudinal surface 3L. The splitting direction-extending surfaces 3D extend in the radial direction of the annular body. The longitudinal surface 3L extends in the longitudinal direction of the split-body parts 2, that is, in the circumferential direction of the annular body. Thus, the splitting surface 3 has a step-like structure.

The step-like portion of the splitting surface 3 shown in FIG. 1 extends in the radial direction in the side view of FIG. 3.

The step-like splitting surface 3 of each of the split-body parts 2 is connected to the step-like splitting surface 3 of an adjacent one of the split-body parts 2, so that the split-body parts 2 assume an annular shape as a whole. Thus, the split-body parts 2 are assembled into the brush seal device 1.

After the brush seal device 1 has been fitted to the casing 50, the longitudinal surfaces 3L, 3L of the splitting surface 3 are formed in a first joining portion 20A such that they remain connected while being in sliding contact with each other regardless of whether the diameter of the brush seal device 1 is increased or reduced. Even if a gap C is created between two adjacent splitting direction-extending surfaces 3D, the first joining portion 20A remains in a state of being sealed in contact. Therefore, leakage of sealed fluid from the first joining portion 20A is prevented. In the brush seal device 1, the step-like portion of each of the splitting direction-extending surfaces 3D is provided with contact surfaces 3D1, 3D1 that are in contact with each other. The contact surfaces 3D1, 3D1 form shutoff joining portions 10D and constitute a shutoff means 10. The longitudinal dimension of these contact surfaces 3D1, 3D1, that is, the shutoff joining portions 10D is equal to the circumferential length. Therefore, the state of being sealed in contact is maintained due to the width of contact, which is equal to the longitudinal dimension even if the diameter of the brush seal device 1 is increased.

Figure 2:
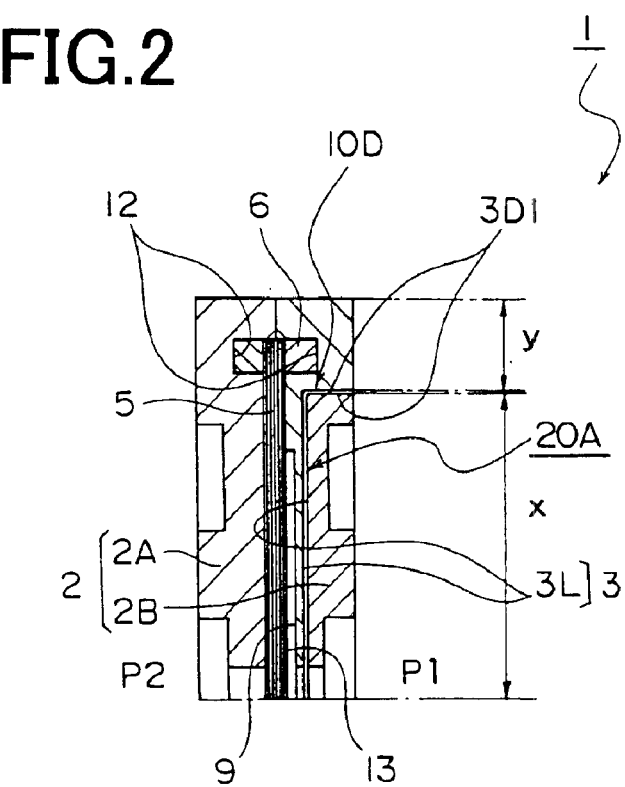
FIG. 2 is a cross-sectional view of a brush seal device according to a second preferred embodiment of the present invention, showing a state where the brush seal device is installed between two component members.

FIG. 2 is a cross-sectional view of the brush seal device 1 according to the second example of the present invention, as viewed in the direction indicated by arrows A, A in FIG. 3. FIG. 3 is a side view of FIG. 2. FIG. 4 is a plan view of both connecting portions 4 shown in FIG. 3, as viewed from their inner-periphery side. It is to be noted herein that dimensions x, y shown in FIG. 2 correspond to dimensions x, y shown in FIG. 3 respectively.

The brush seal device 1 shown in FIG. 2 is different from the brush seal device 1 shown in FIG. 1 especially in the fixture portion 6 of the brush seal 5. The fixture portion 6 of the brush seal 5 of the brush seal device 1 shown in FIG. 2 has a rectangular cross-sectional shape. The entire lateral face shown in FIG. 3 is in the shape of an arc having a length corresponding to the length of the split-body parts 2. The brush seal 5 and the fixture portion 6 are connected to each other by high-precision welding with the aid of a welder. The fixture portion 6 of the brush seal 5 is securely clamped on its opposed sides while being securely fitted to a fitting portion 12 where the back plate portion 2A and the holding plate portion 2B are fitted together. These three component members, namely, the fixture portion 6 of the brush seal 5, the back plate portion 2A, and the holding plate portion 2B serve to constitute a corresponding one of the split-body parts 2.

As shown in FIG. 3, the splitting surface 3 of the brush seal device 1 shown in FIG. 2 inclines with respect to the radial direction of the split-body parts 2. Each pair of the splitting direction-extending surfaces 3D shown in FIGS. 3 and 4 has the narrow gap C formed therebetween. In the first joining portion 20A, however, the longitudinal surfaces 3L, 3L are in close contact with each other so as to seal in the sealed fluid. Although the description of other structural details is omitted herein, the brush seal device 1 shown in FIG. 2 is constructed substantially in the same manner as shown in FIG. 1.

Referring to FIG. 3, a rubber-like sealing plate 10T made from a super-elastic alloy is provided in each of the first joining portion 20A and the shutoff joining portions 10D. This construction is based on the third example of the present invention.

It is indispensable that the shutoff joining portions 10D be provided with the rubber-like sealing plate 10T. The shutoff means 10 is constructed by providing the shutoff joining portions 10D with a rubber-like sealing plate 20T.

It is preferable that this super-elastic alloy be Cu—Al—Ni alloy. Besides, Ni—Ti alloy, Cu—Zn alloy, and the like are also appropriate. The super-elastic alloy is manufactured by quenching following a thermal treatment that lasts for about two hours at 1000° C. The super-elastic alloy exhibits an elastic strain limit of 20%.

Figure 5:
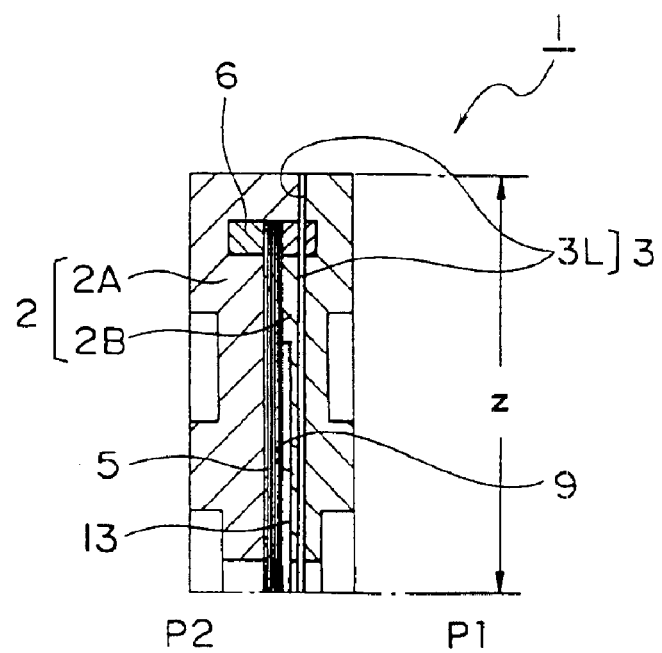
FIG. 5 is a cross-sectional view of a brush seal device according to a third preferred embodiment of the present invention.

FIG. 5 is a cross-sectional view of the brush seal device 1 according to the fourth example of the present invention, as viewed in the direction indicated by arrows A, A in FIG.

Figure 6:
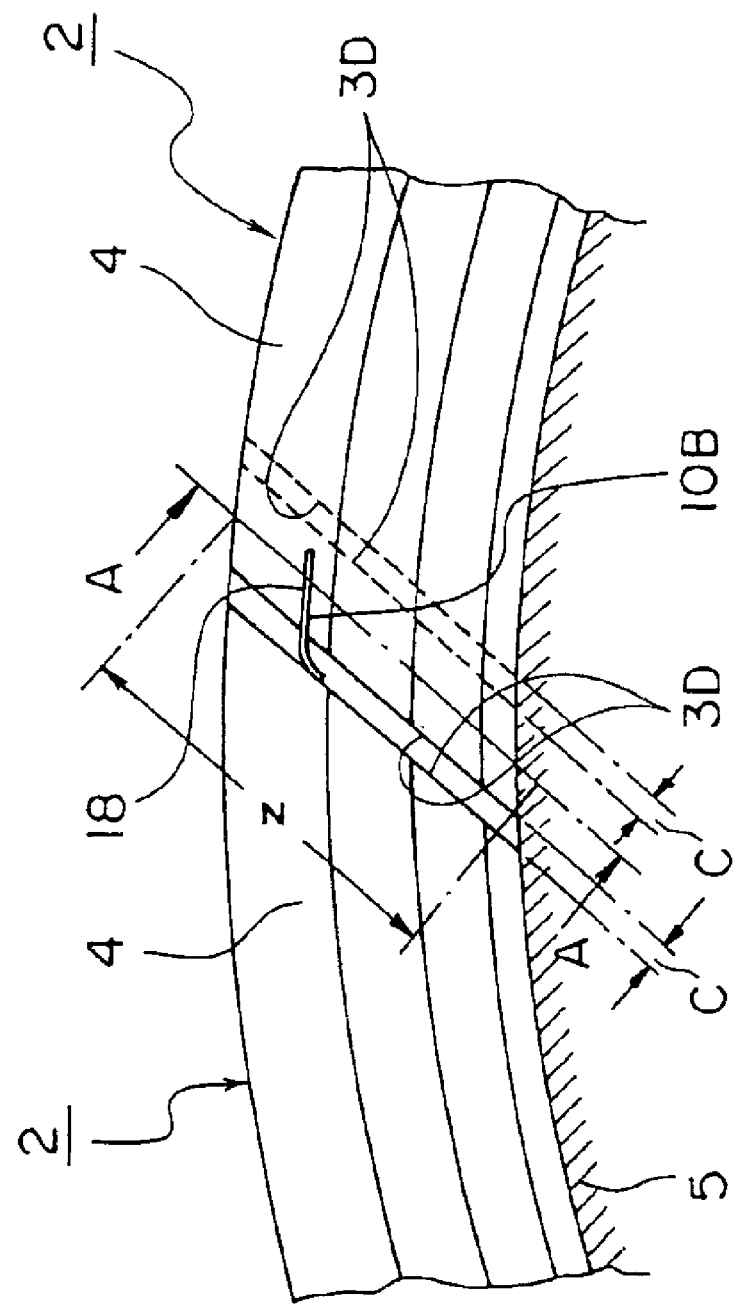
FIG. 6 is a side view of the brush seal device shown in FIG. 5.
Figure 7:
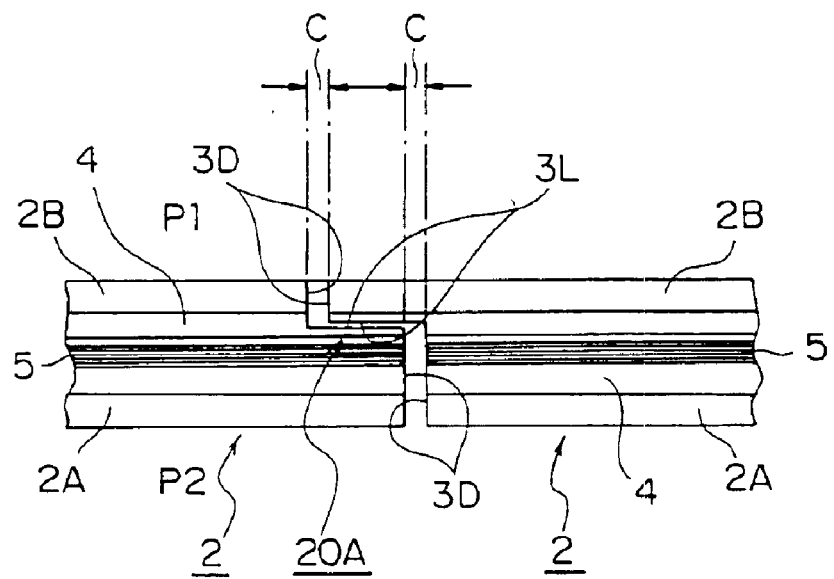
FIG. 7 is a plan view of the brush seal device shown in FIG. 5 as viewed from its inner-diameter side.
Figure 8:
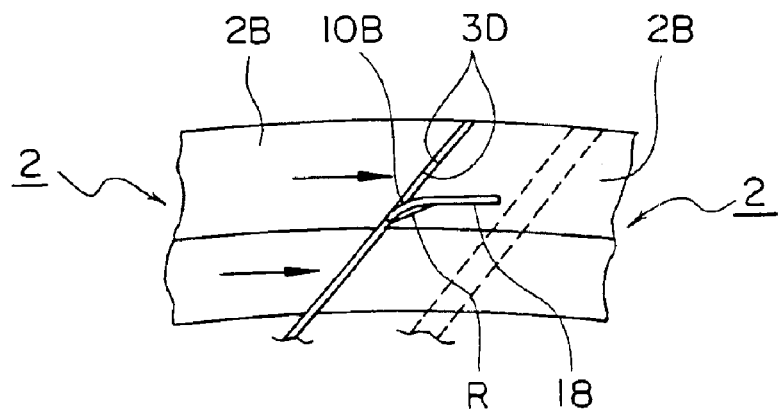
FIG. 8 is a side view of a connecting portion of the brush seal device according to a second example of the one shown in FIG. 6.
Figure 9:
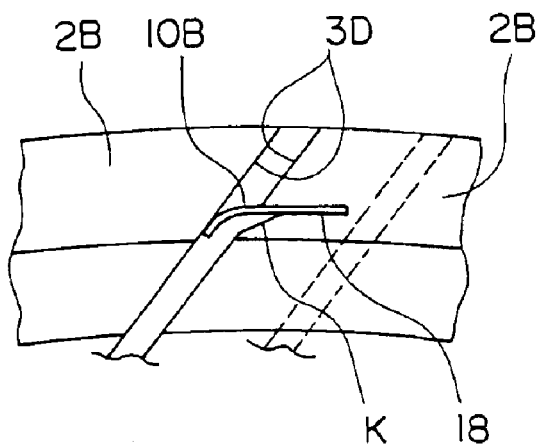
FIG. 9 is a side view of a connecting portion of the brush seal device according to a third example of the one shown in FIG. 6.

6. FIG. 6 is a side view of FIG. 5. FIG. 7 is a plan view of both the connecting portions 4 as viewed from the inner-diameter side in FIG. 5. FIG. 8 is a side view of the first example corresponding to the shutoff means 10 shown in FIG. 6, showing a state where the gap C has been narrowed. FIG. 9 is a side view showing how an elastic sealing plate 10B according to the second embodiment is deformed in a state where the gap C shown in FIG. 8 has been widened. The longitudinal dimension shown in FIG. 5 is marked with z so as to indicate that it is equal to the dimension z shown in FIG. 6.

The brush seal device 1 shown in FIG. 5 is constructed substantially in the same manner except for the connecting portions shown in FIG. 2.

The splitting surface 3 shown in FIG. 5 is different from the one shown in FIG. 3. That is, the splitting surface 3 shown in FIG. 5 extends straight in an inclined state. The elastic sealing plate 10B is provided in such a manner as to extend across the gap C formed between the splitting direction-extending surfaces 3D, 3D on the side of a high pressure P1. The elastic sealing plate 10B constitutes the shutoff means 10.

The front-end side of the elastic sealing plate 10B is bent toward sealed fluid in an elastically deformable manner. The root side of the elastic sealing plate 10B is securely fitted into and thus mounted to a slit 18 formed in the holding plate portion 2B. The free-end side of the elastic sealing plate 10B extends across the gap C and is in close contact with the splitting direction-extending surface 3D. The front-end side of the free-end portion of the elastic sealing plate 10B is in contact with the splitting direction-extending surface 3D while being in an elastically deformed state. The front-end side of the free-end portion of the elastic sealing plate 10B moves in response to a possible change in the gap C and performs the function of sealing. Instead of being securely fitted into the slit 18, the root side of the elastic sealing plate 10B may be mounted thereto according to a different method such as welding, soldering, adhesion, caulking, or the like.

FIG. 6 shows an example in which the gap C is open to a normal extent. FIG. 7 is a plan view of the connecting portions 4 shown in FIG. 6, as viewed from their inner-diameter side. The gap C is designed to change during operation so as to effectively prevent the brush seal 5 from coming into press-contact with a rotational shaft 60 and being abraded.

FIG. 8 shows the elastic sealing plate 10B according to the first embodiment. The elastic sealing plate 10B shown in FIG. 8 constitutes the shutoff means 10 shown in FIG. 6.

Referring to FIGS. 8 and 9, the lower root side of the elastic sealing plate 10B assumes the shape of a chamfered arc R or a slanting arc K so as to cope with the case where the gap shown in FIG. 6 has been narrowed. FIG. 8 shows, as an example occurring during operation, a state where the gap C has been narrowed in comparison with the gap C shown in FIG. 6.

Contrary to FIG. 8, FIG. 9 shows a state where the gap C has been widened during operation. FIGS. 8 and 9 both show how the elastic sealing plate 10B is elastically deformed in response to a dimensional change of the gap C, shuts the gap C off, and seals fluid.

Figure 10:
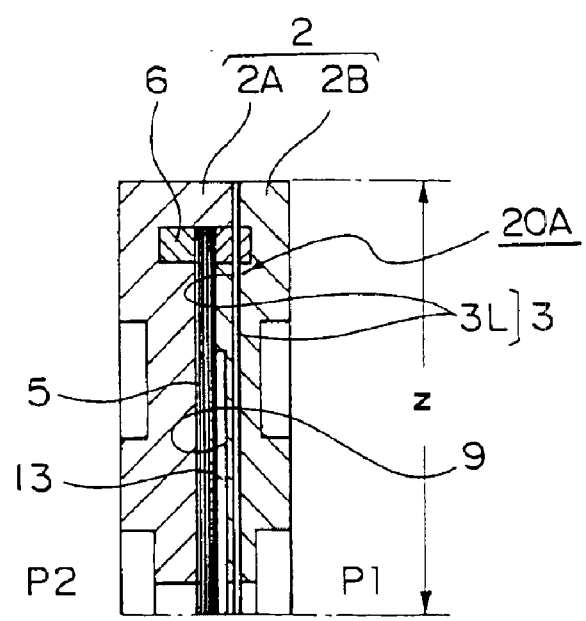
FIG. 10 is a cross-sectional view of a brush seal device according to a fourth embodiment of the present invention.
Figure 11:
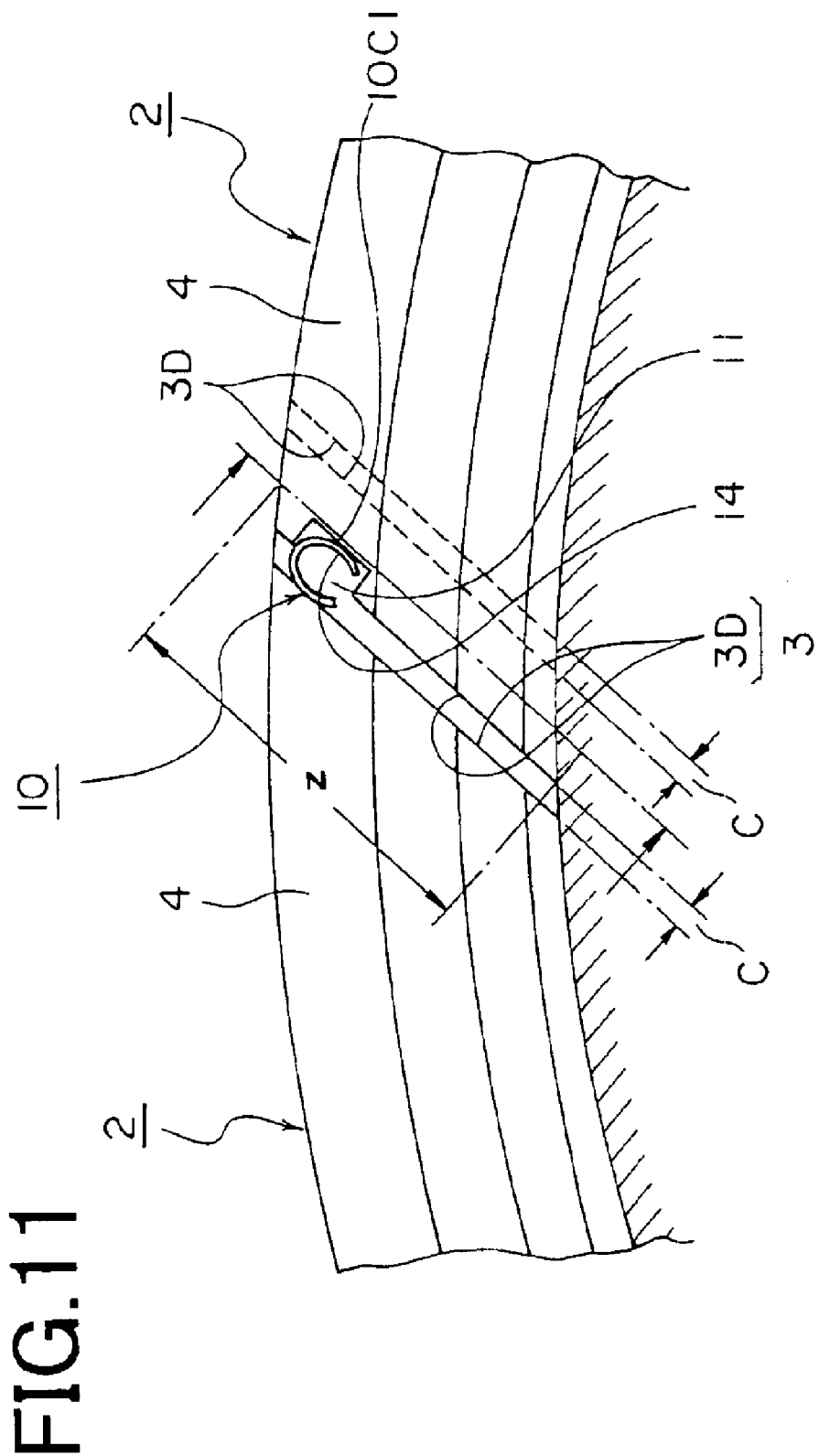
FIG. 11 is a side view of a connecting portion of the brush seal device, showing a first example of an elastically deformable plate-type sealing portion 10C shown in FIG. 10, which is deformed.
Figure 12:
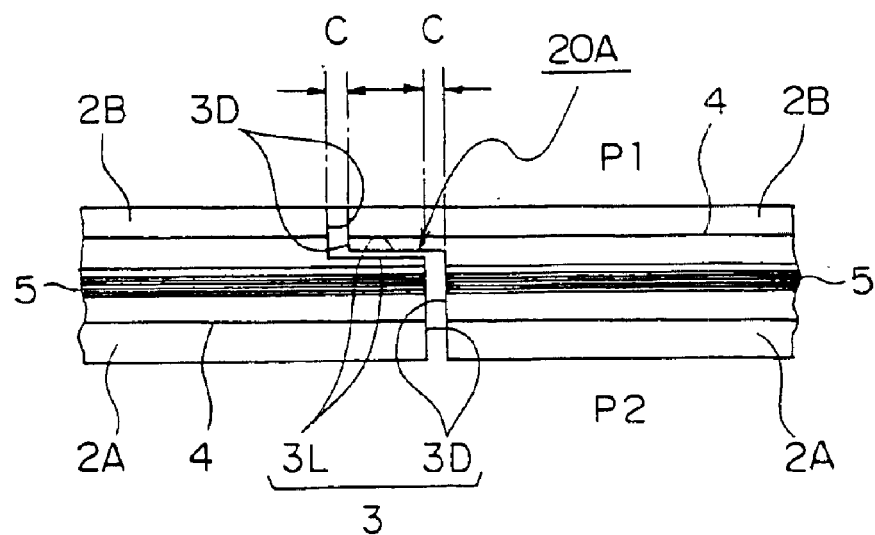
FIG. 12 is a plan view of the brush seal device shown in FIG. 10 as viewed from its inner-diameter side.
Figure 13:
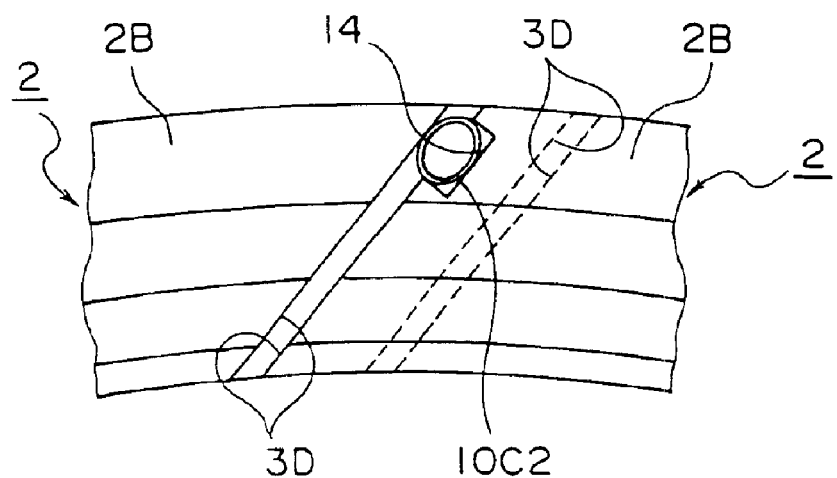
FIG. 13 is a side view of a connecting portion of the brush seal device, showing a second example of the elastically deformable plate-type sealing portion 10C shown in FIG. 11.
Figure 14:
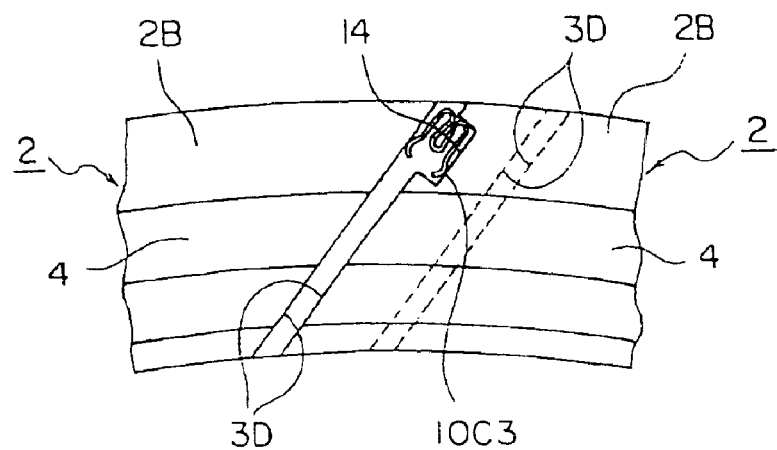
FIG. 14 is a side view of a connecting portion of the brush seal device, showing a third example of the elastically deformable plate-type sealing portion 10C shown in FIG. 11.
Figure 15:
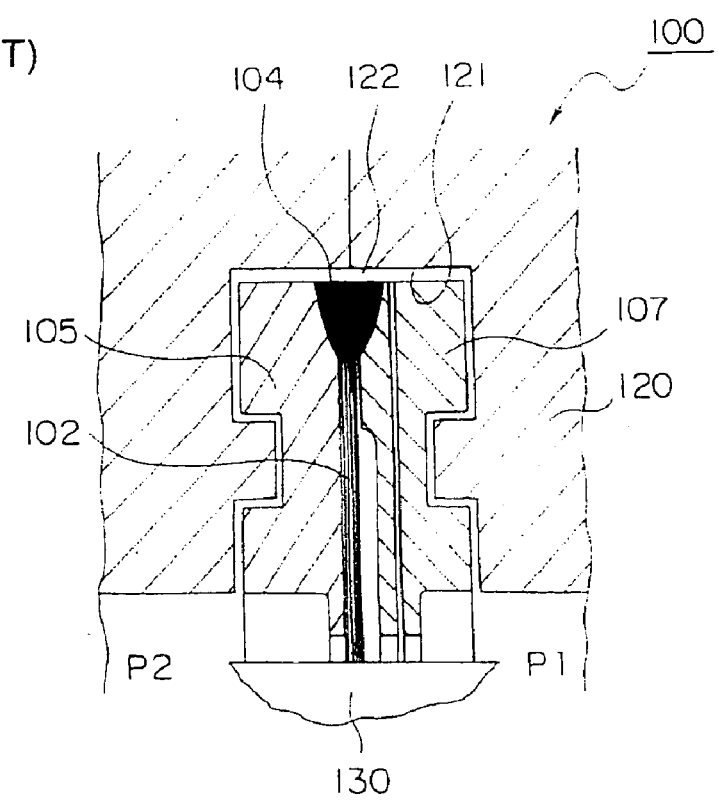
FIG. 15 is a cross-sectional view of a brush seal device according to the art related to the present invention, showing a state where the brush seal device is installed between two component members.
Figure 16:
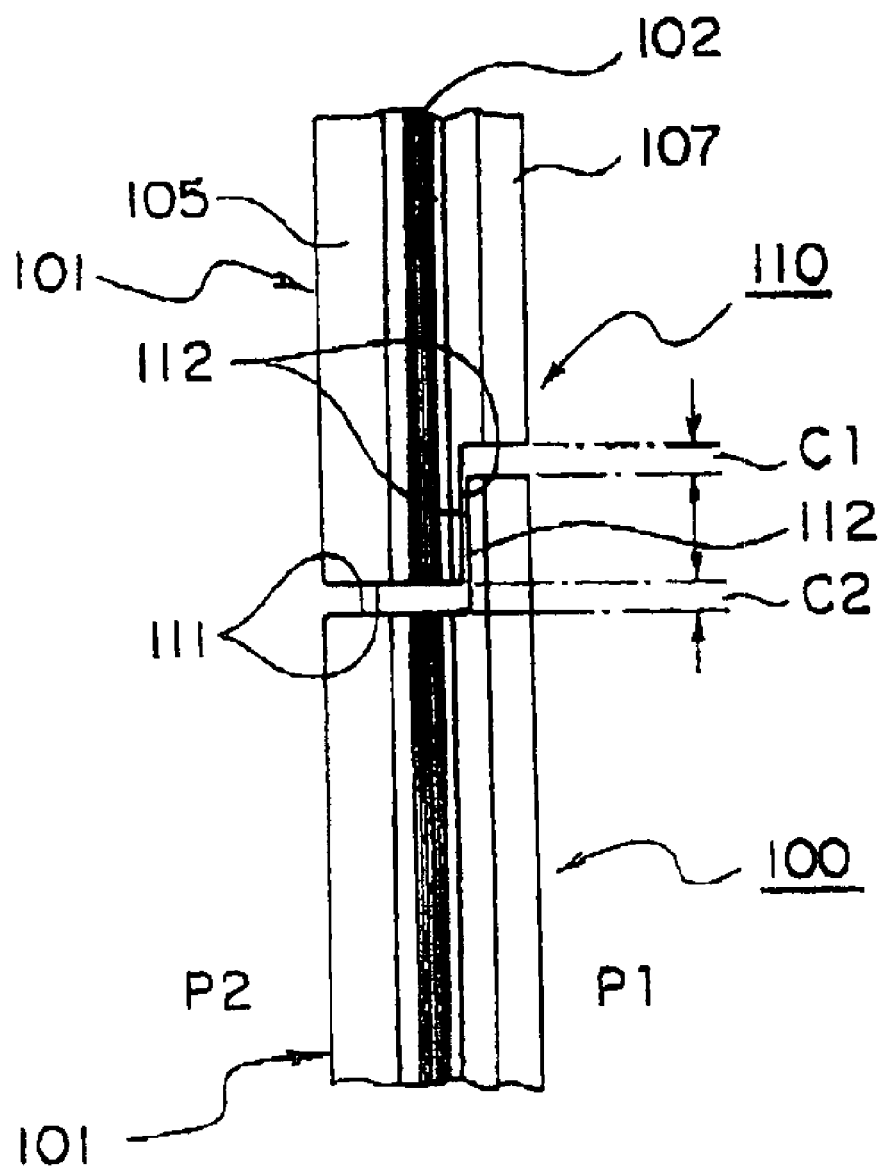
FIG. 16 is a plan view of the brush seal device shown in FIG. 15 as viewed from its inner-diameter side.
Figure 17:
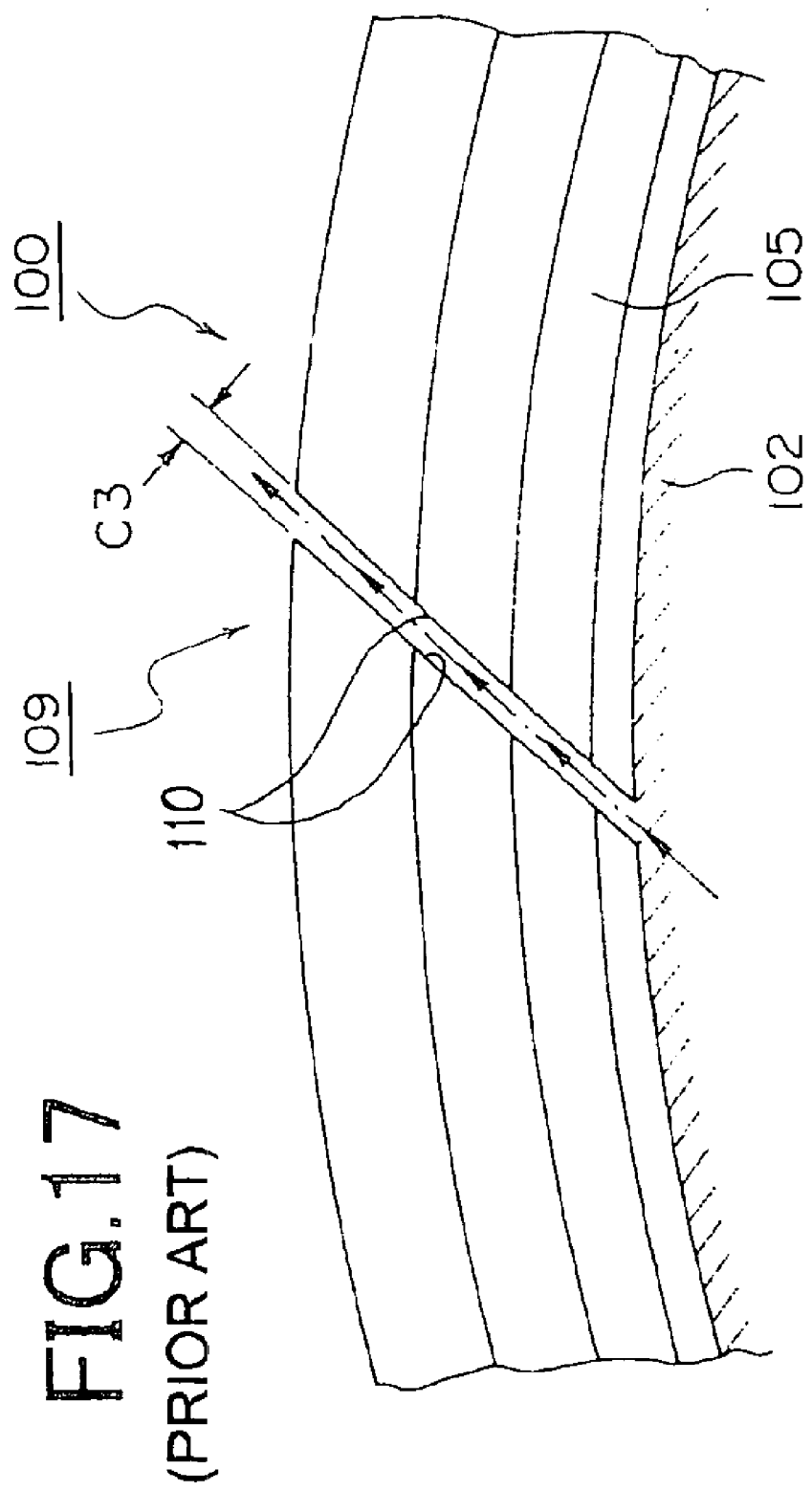
FIG. 17 is a side view of another brush seal device according to the art related to the present invention.
Figure 18:
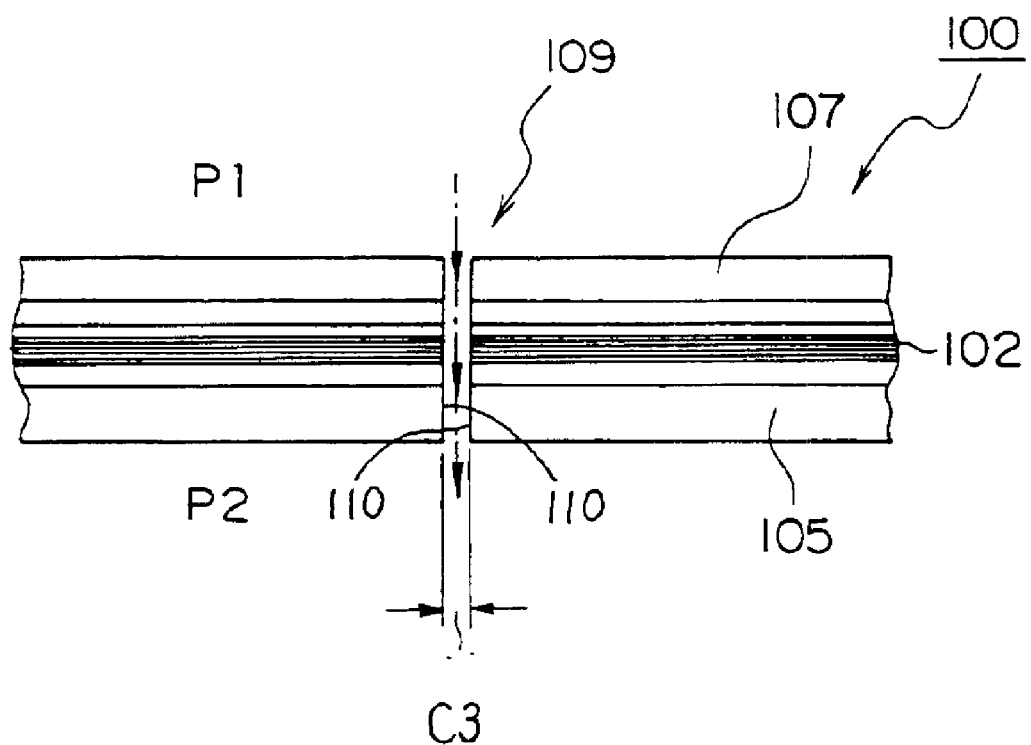
FIG. 18 is a plan view of the brush seal device shown in FIG. 17 as viewed from its inner-diameter side.

FIG. 10 is a cross-sectional view of the brush seal device 1 according to the fifth example of the present invention. FIG. 11 is a side view of the connecting portions 4 shown in FIG. 10. FIG. 12 is a plan view of both the connecting portions 4 shown in FIG. 10, as viewed from their inner-diameter sides. FIG. 13 is a side view of the shutoff means 10 according to the first embodiment of the present invention, which corresponds to the shutoff means 10 shown in FIG. 11. FIG. 14 is a side view of the shutoff means 10 according to the second embodiment of the present invention, which corresponds to the shutoff means 10 shown in FIG. 11.

In the brush seal device 1 shown in FIG. 10, a first elastically deformable plate-type sealing portion 10C1 having a C-shaped cross-section corresponds to the shutoff means 10, which is the elastic sealing plate 10B shown in FIG. 6. The first elastically deformable plate-type sealing portion 10C1 is a concrete example of the elastically deformable plate-type sealing portion 10C. The first elastically deformable plate-type sealing portion 10C1 is disposed in a fitting groove 14 formed in the splitting direction-extending surface 3D in one of the split-body parts 2, thus constituting the shutoff means 10.

The side of a C-shaped opening 11 of the first elastically deformable plate-type sealing portion 10C1 is disposed facing the side where sealed fluid enters. The inner space of the first elastically deformable plate-type sealing portion 10C1 is radially enlarged due to the pressure of sealed fluid, so that the contact surface pressure is increased to the extent of making it possible to perform the function of sealing.

Because the first elastically deformable plate-type sealing portion 10C1 has a C-shaped cross-section, it is elastically deformed to a great extent. Thus, the first elastically deformable plate-type sealing portion 10C1 can seal the gap C effectively in accordance with the change in the opening of the gap C.

FIG. 12 shows the width of each of the gaps C in the splitting direction-extending surface 3, as viewed from the inner-periphery side in FIG. 11. The longitudinal surfaces 3L, 3L are in contact with each other and constitute the first joining portion 20A. The first connecting portion is formed in the longitudinal direction. Therefore, even if the first connecting portion is displaced longitudinally, it can constantly maintain a state of contact and shut the gap C off.

A second elastically deformable plate-type sealing portion 10C2 having an O-shaped cross-section as shown in FIG. 13 is the first embodiment of the elastically deformable plate-type sealing portion 10C constituting the shutoff means 10. The second elastically deformable plate-type sealing portion 10C2 is disposed in the fitting groove 14 that is equivalent to the fitting groove 14 shown in FIG. 11.

Although the second elastically deformable plate-type sealing portion 10C has an O-shaped cross-section, it has a small thickness. Therefore, the second elastically deformable plate-type sealing portion 10C can be elastically deformed and strictly follow dimensional changes of the gap C.

In particular, it is preferable that the second elastically deformable sealing portion 10C2 be made from an axially open spring steel pipe, a stainless pipe, or the like. It is more preferable that the second elastically deformable plate-type sealing portion 10C2 be made from a super-elastic alloy.

FIG. 14 shows a third elastically deformable plate-type sealing portion 10C3 having a W-shaped cross-section. The third elastically deformable plate-type sealing portion 10C3 is the second embodiment of the elastically deformable plate-type sealing portion 10C constituting the shutoff means 10. As in the case of the first elastically deformable plate-type sealing portion 10C1 shown in FIG. 11, the third elastically deformable plate-type sealing portion 10C3 is also disposed in the fitting groove 14. Because the third elastically deformable plate-type sealing portion 10C3 has a W-shaped cross-section, it can be elastically deformed to a great extent and can cope with an increase or decrease in dimension of the gap C.

It is preferable that the elastically deformable plate-type sealing portion 10C described above be made from a spring steel plate or a stainless plate. It is more preferable that the elastically deformable plate-type sealing portion 10C be made from a super-elastic alloy plate or the like. A plate made from a selected one of these materials is processed and formed into an elastically deformable plate. For instance, this elastically deformable plate has a cross-section in the shape of O, C, V, W, X, D, or S.

Hereinafter, other preferred embodiments of the present invention will be described.

In the brush seal device according to the second preferred embodiment of the present invention, the shutoff means has longitudinal contact surfaces formed in a step-like structure of the splitting direction-extending surfaces, and is constructed in a joining portion where the contact surfaces are joined with each other.

This brush seal device of the present invention is designed to cause only sliding movements in the direction of travel of the connecting portions and maintain a state of contact of the contact surfaces even if the connecting portions serving as the shutoff means have been displaced longitudinally in such a manner as to increase or reduce the dimension between the splitting direction-extending surfaces. Thus, it becomes possible to seal the gap between the splitting direction-extending surfaces. Accordingly, the construction of the second embodiment makes it possible to enlarge the extent to which the diameter of the brush seal device is increased or reduced.

In the brush seal device according to the third preferred embodiment of the present invention, the shutoff means has the sealing plate made from a super-elastic alloy material on the contact surfaces.

In this brush seal device of the present invention, since the rubber-like super-elastic alloy is interposed between the contact surfaces, the state of contact of the connecting portions serving as the shutoff means makes it possible to seal in sealed fluid reliably. This alloy is heat-resistant and thus can also be used at high temperatures.

In the brush seal device according to the fourth preferred embodiment of the present invention, the shutoff means is composed of the elastic sealing plate extending across and shutting off the gap between the splitting direction-extending surfaces that are opposed to each other.

This brush seal device of the present invention is designed such that the shutoff means is composed of the elastic sealing plate and that the free-end face of the elastic sealing plate extends across the gap between the splitting direction-extending surfaces, elastically comes into contact with them, and seal the gap. Therefore, the gap between the splitting direction-extending surfaces can be sealed reliably. For example, the free-end face of the elastic sealing plate can even follow enlargement of the diameter corresponding to the pressing force of the rotational shaft and still seal the gap. That is, it becomes possible to quickly cope with the increase or decrease in diameter resulting from fluctuations of the rotational shaft and seal the gap.

In the brush seal device according to the fifth preferred embodiment of the present invention, the shutoff means is composed of the elastically deformable plate-type sealing portion that is disposed between the splitting direction-extending surfaces so as to shut off the gap therebetween and that is joined with the splitting direction-extending surfaces.

In this brush seal device of the present invention, the shutoff means is constructed of the elastically deformable plate-type sealing portion. Therefore, this brush seal device achieves a press-contact state reliably and performs the function of sealing. At the same time, this brush seal device returns to its original shape in response to a drop in pressure and still makes it possible to perform the function of sealing. If the pressure of sealed fluid is applied to the elastically deformable plate-type sealing portion, the elastically deformable plate-type sealing portion cooperates with the pressure and performs the function of sealing.

The brush seal device according to the present invention achieves the following effects.

In the brush seal device according to the preferred first embodiment of the present invention, each of the connecting portions at the opposed ends of each of the split-body parts is provided with the step-like splitting surface, which is composed of the splitting direction-extending surfaces and the longitudinal surface. Even if the gap between the splitting direction-extending surfaces is widened, for example, in the case where the inner diameter of the brush seal device has been increased, the shutoff means that constantly performs the function of sealing seals and shuts off the passage that is formed of the gap and the casing to which the brush seal device is mounted, irrespective of the width of the gap.

The construction allowing the shutoff means to constantly seal the gap between the splitting surfaces of the split-body parts irrespective of the dimensional change of the gap makes it possible to realize a design in which the diameter of each of the split-body parts can be increased in accordance with the pressing force that may be applied to the brush seal as a result of oscillation of the rotational shaft. Therefore, the effects of minimizing friction of the brush seal and preventing abrasion of the brush seal can be achieved.

In the brush seal device according to the preferred second embodiment of the present invention, the splitting direction-extending surfaces have the contact surfaces that constitute the step-like portions and that extend longitudinally. The contact surfaces are connected to each other and constitute the shutoff joining portions for shutting the gap off. Also, even if the gap between the splitting direction-extending surfaces is widened, the shutoff joining portions slide with respect to each other along the width of the gap between the splitting direction-extending surfaces. Therefore, the gap can be sealed constantly. The shutoff means is constructed in this manner. For example, in the case where the brush seal device constructed by connecting the split-body parts is designed such that the inner diameter of the brush seal can be increased or reduced, even if oscillation of the rotational shaft causes enlargement of the inner diameter to the extent of widening the gap, the shutoff joining portions can be constantly held in contact with each other. Therefore, the effect of constantly shutting the gap off in accordance with the length of the contact surfaces constituting the shutoff joining portions can be achieved.

In the brush seal device according to the third preferred embodiment of the present invention, the longitudinal contact surfaces are provided with the sealing plate made from the super-elastic alloy as the shutoff means. Therefore, the sealing plate adheres to the contact surfaces like a rubber-like elastic body and achieves the effect of sealing the gap between the contact surfaces. In particular, the super-elastic alloy exhibits a rubber-like elastic force and thus achieves the effect of sealing the gap even if the contact surfaces undergo slight oscillation or the like.

In the brush seal device according to the preferred fourth embodiment of the present invention, the cantilever elastic sealing plate is provided as the shutoff means. The free-end portion of the cantilever elastic sealing plate is elastically deformed and is in contact with the splitting direction-extending surfaces that are opposed to each other. Therefore, even if the gap between the splitting direction-extending surfaces that are opposed to each other is widened, the elastic deformation follows the dimensional change and ensures a state of being sealed in contact. Thus, the effect of constantly shutting off and sealing the gap between the splitting direction-extending surfaces can be achieved.

In the brush seal device according to the preferred fifth embodiment of the present invention, the elastically deformable plate-type sealing portion is provided as the shutoff means. The elastically deformable plate-type sealing portion, which is mounted to the fitting groove, tightly adheres to opposed faces of the splitting direction-extending surfaces and seals the gap between these surfaces. Therefore, the elastically deformable plate-type sealing portion exhibits a great contact force and achieves the effect of sealing the gap while ensuring a state of contact.

The aforementioned preferred embodiments of the present invention have been described for the purpose of exemplification. It is obvious that the present invention should neither fit in the aspects disclosed herein nor be limited thereto and that numerous amendments and modifications are possible in the light of the teachings of the foregoing description. The technical scope of the present invention is defined by the claims.

What is claimed is:

1. A brush seal device in which splitting surfaces of a plurality of split-body parts are combined with one another and which is mounted to one of opposed component members so as to seal a gap between said component members, comprising:

a brush seal formed in a wall shape in the longitudinal direction of a fixture portion which is fixed at one end thereof;

said split-body parts which hold said brush seal and each of which has connecting portions that are split and that extend along said splitting surfaces, wherein each of said splitting surfaces is composed of splitting direction-extending surfaces that extend in such a direction as to split said split-body parts and a longitudinal surface that extends in the longitudinal direction of said split-body parts and that forms a step interposed between said splitting direction-extending surfaces, wherein said splitting surfaces are formed at different circumferential positions on both axial sides of the brush seal, and wherein each of said splitting direction-extending surfaces has shutoff means for sealing a gap between said splitting direction-extending surfaces that are combined with each other.

2. The brush seal device according to claim 1, wherein said shutoff means has longitudinal contact surfaces formed in a step structure of said splitting direction-extending surfaces and is constructed in a joining portion where said contact surfaces are joined with each other.

3. The brush seal device according to claim 2, wherein said shutoff means has a sealing plate made from a super-elastic alloy material on said contact surfaces.

4. The brush seal device according to claim 1, wherein said shutoff means is constructed of an elastic sealing plate that extends across and shuts off the gap between opposed faces of said splitting direction-extending surfaces.

5. The brush seal device according to claim 1, wherein said shutoff means is constructed of an elastically deformable plate sealing portion that is disposed between opposed faces of said splitting direction-extending surfaces so as to shut off the gap therebetween and that is joined with said opposed faces.

6. A brush seal device in which splitting surfaces of a plurality of split-body parts are combined with one another and which is mounted to one of opposed component members so as to seal a gap between said component members, comprising:

a brush seal formed in a wall shape;

said split-body parts which hold said brush seal and each of which has connecting portions that are split and that extend along said splitting surfaces, wherein each of said splitting surfaces has not only axial step but also radial step, said splitting surfaces are formed at different circumferential positions on both axial sides of the brush seal, said split-body parts are connected to one another so as to make a circumferential clearance between the splitting surfaces of the connected split-body parts and said radial step is formed along a radial way of the circumferential clearance in order that the circumferential clearance is interrupted by the radial step.

7. A brush seal device in which splitting surfaces of a plurality of split-body parts are combined with one another and which is mounted to one of opposed component members so as to seal a gap between said component members, comprising:

a brush seal formed in a wall shape;

said split-body parts which hold said brush seal and each of which has connecting portions that are split and that extend along said splitting surfaces, wherein each of said splitting surfaces has an axial step and sealing means are disposed between opposed faces of splitting direction-extending surfaces of said splitting surfaces, and wherein said splitting surfaces are formed at different circumferential positions on both axial sides of the brush seal.

8. The brush seal device according to claim 6, wherein the radial step is formed at a position between a tip end and base end of a brush of the brush seal.

9. The brush seal device according to claim 6, wherein the radial step and the axial step are formed at only one axial side of the brush seal.

10. The brush seal device according to claim 6, wherein the different circumferential positions comprise different radial planes.

* * * * *